United States Patent
Brogan et al.

(10) Patent No.: US 12,196,178 B2
(45) Date of Patent: Jan. 14, 2025

(54) WIND FARM BLACK START

(71) Applicant: Siemens Gamesa Renewable Energy A/S, Brande (DK)

(72) Inventors: Paul Brian Brogan, Glasgow (GB); Douglas Elliott, Glasgow (GB); Thyge Knueppel, Værløse (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/284,315

(22) PCT Filed: Mar. 9, 2022

(86) PCT No.: PCT/EP2022/056078
§ 371 (c)(1),
(2) Date: Sep. 27, 2023

(87) PCT Pub. No.: WO2022/207264
PCT Pub. Date: Oct. 6, 2022

(65) Prior Publication Data
US 2024/0151208 A1    May 9, 2024

(30) Foreign Application Priority Data
Mar. 29, 2021   (EP) .................................. 21165585

(51) Int. Cl.
*F03D 7/02* (2006.01)
*F03D 7/04* (2006.01)
*H02J 3/38* (2006.01)

(52) U.S. Cl.
CPC ............. *F03D 7/026* (2013.01); *F03D 7/048* (2013.01); *H02J 3/381* (2013.01);
(Continued)

(58) Field of Classification Search
CPC .......... F03D 7/026; F03D 7/048; H02J 3/381; H02J 2300/28; H02J 3/472;
(Continued)

(56) References Cited

U.S. PATENT DOCUMENTS

| | | | |
|---|---|---|---|
| 11,286,903 B2 * | 3/2022 | Brogan | F03D 7/048 |
| 2015/0380942 A1 * | 12/2015 | Premm | H02M 7/44 |
| | | | 307/52 |
| 2020/0400120 A1 * | 12/2020 | Brogan | H02J 11/00 |

FOREIGN PATENT DOCUMENTS

| | | | | |
|---|---|---|---|---|
| WO | WO-2019166290 A1 * | 9/2019 | ............. | F03D 7/026 |
| WO | WO-2019243055 A1 * | 12/2019 | ................ | H02J 3/18 |

OTHER PUBLICATIONS

International Search Report & Written Opinion for PCT/EP2022/056078, issued on Jul. 5, 2022.

\* cited by examiner

*Primary Examiner* — Brian Christopher Delrue
(74) *Attorney, Agent, or Firm* — Schmeiser, Olsen & Watts LLP

(57) ABSTRACT

A method of performing a black start in a wind farm is provided, the wind farm including a primary black start enabled wind turbine, at least one secondary black start enabled wind turbine, and a wind farm grid interconnecting at least a part of the wind turbines in the wind farm, the method including (a) starting the primary black start enabled wind turbine in black start mode in order to supply voltage to the wind farm grid, (b) monitoring, at the at least one secondary black start enabled wind turbine, an electric parameter value in the wind farm grid, and (c) starting the at least one secondary black start enabled wind turbine in black start mode in order to supply voltage to the wind farm
(Continued)

grid when the monitored electric parameter value meets a predetermined condition. A corresponding wind farm is also provided.

12 Claims, 2 Drawing Sheets

(52) U.S. Cl.
CPC ..... *F05B 2260/85* (2013.01); *F05B 2270/337* (2013.01); *H02J 2300/28* (2020.01)

(58) Field of Classification Search
CPC ............. H02J 13/00009; H02J 2310/18; F05B 2260/85; F05B 2270/337
See application file for complete search history.

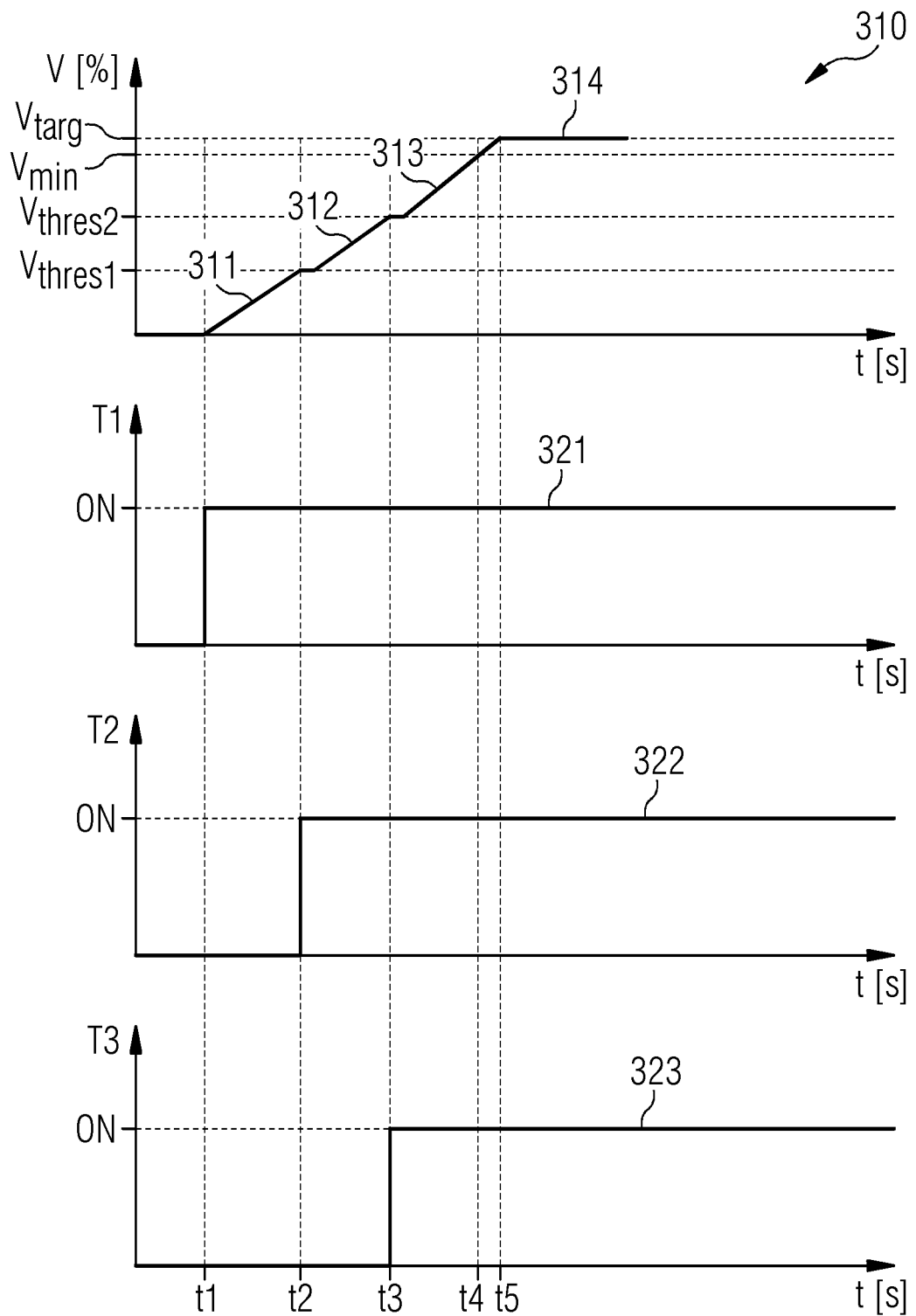

WIND FARM BLACK START

CROSS-REFERENCE TO RELATED APPLICATIONS

This application claims priority to PCT Application No. PCT/EP2022/056078, having a filing date of Mar. 9, 2022, which claims priority to European Application No. 21165585.7, having a filing date of Mar. 29, 2021, the entire contents both of which are hereby incorporated by reference.

FIELD OF TECHNOLOGY

The following relates to the field of wind parks, in particular to methods of performing a black start in a wind farm. Furthermore, the following relates to a wind farm with black start capability.

BACKGROUND

Until now, wind farms have neither been required to nor been capable of participating in black start and system restorations. With increasing importance of wind farms in the production of electrical power, black start capability of wind farms may become beneficial, both in terms of the capability of contributing to a black start of the public supply grid as well as the capability to start a wind park in the absence of external power.

When starting up wind farms without connection to the outside power system, diesel generators have typically been brought in and connected to either the individual wind turbines or at a substation. This is cumbersome and expensive, especially when operating offshore equipment.

A further obstacle is that larger wind farms will require that several wind turbines contribute to energizing the wind farm network. It is not desirable to leave the wind farm voltage at levels outside the nominal range for a prolonged period of time as the electrical components within the wind farm have not been designed for such operation. This means that the participating wind turbines must be started up in a coordinated fashion so they jointly can energize the wind farm network. However, when a wind farm is de-energized, it cannot be assumed that communication between the wind turbines is operational if the communications network is daisy chained between the wind turbines unless all wind turbines in the daisy chain has operational IT equipment, e.g., switches, supplied via a power source, such as a UPS. That is, it cannot be assumed that a black start can be coordinated from a central SCADA system. Even in situations where communication is available, it is advantageous to have a setup that does not depend on communication for time critical information.

There may thus be a need for ways of black starting a wind farm in a simple, coordinated, safe, and reliable manner.

SUMMARY

An aspect relates to a method of performing a black start in a wind farm, the wind farm comprising a primary black start enabled wind turbine, at least one secondary black start enabled wind turbine, and a wind farm grid interconnecting at least a part of the wind turbines in the wind farm. In embodiments, the method comprises (a) starting the primary black start enabled wind turbine in black start mode in order to supply voltage to the wind farm grid, (b) monitoring, at the at least one secondary black start enabled wind turbine, an electric parameter value in the wind farm grid, and (c) starting the at least one secondary black start enabled wind turbine in black start mode in order to supply voltage to the wind farm grid when the monitored electric parameter value meets a predetermined condition.

This aspect of embodiments of the invention are based on the idea that a primary black start enabled wind turbine starts operating in black start mode while at least one secondary black start enabled wind turbine monitors an electric parameter value in the wind farm grid and then begins operating in black start mode when the monitored electric parameter value meets a predetermined condition. In other words, the at least one secondary black start enabled wind turbine joins the primary black start enabled wind turbine in supplying voltage to the wind farm grid once the monitored electric parameter value meets the predetermined condition. Hence, no centralized control of the secondary black start enabled wind turbine is necessary. By choosing the predetermined condition carefully, it can be assured that the secondary black start enabled wind turbine joins the primary black start enabled wind turbine in such a way that the overall black start process is optimized, in particular such that a smooth and rapid energization of the wind farm grid with minimum risk of causing damage to the electrical components of the wind turbines and wind farm grid can be achieved.

It should be noted that the black start may be applied on a subset of the wind farm equipment, e.g., a single or multiple radials, the entire wind farm network, or it may cover both the wind farm network and part of the external transmission system.

In the present context, the term "black start enabled wind turbine" may in particular denote a wind turbine that is capable of operating (at least for a certain period of time) in the absence of external power, e.g., in situations where the public utility grid is down or where the wind turbine (possibly as part of wind park with multiple wind turbines) is disconnected from the public utility grid. A black start enabled wind turbine may in particular have its own auxiliary generator (such as a diesel generator, a solar panel, or any other kind of generator) and/or energy storage (such as a battery or capacitor bank, an uninterrupted power supply, UPS, or the like) capable of providing enough power to operate the wind turbine on its own for some time.

In the present context, the term "black start mode" may in particular denote a mode of operation where a wind turbine is operating to energize a wind farm grid in the absence of external power.

In the present context, the term "wind farm grid" may in particular denote an electrical network that interconnects several or all wind turbines in the wind farm. In some cases, a wind farm may comprise several grids which are in turn interconnected and thus forms individual segments of the network structure within the wind farm. In the present context, the "wind farm grid" interconnects at least the primary and secondary black start enabled wind turbines.

According to an embodiment of the invention, the electric parameter value is a voltage level in the wind farm grid, and the predetermined condition is met when the voltage level is above a predetermined voltage threshold value.

In other words, the wind farm grid voltage is monitored by the at least one secondary black start enabled wind turbine and compared with the predetermined voltage threshold value to determine when the voltage threshold value is exceeded. Thereby, when the wind farm grid voltage raises to a level above the predetermined voltage threshold value, in particular as a result of the primary black start enabled wind turbine (and possible other second black start enabled wind turbines) supplying power to the wind farm grid, the at least one secondary black start enabled wind turbine starts operating in black start mode to also supply power to the wind farm grid.

According to a further embodiment of the invention, the electric parameter value is a voltage frequency in the wind farm grid, and the predetermined condition is met when the voltage frequency is above or below a predetermined frequency threshold value.

In other words, the wind farm grid frequency is monitored by the at least one secondary black start enabled wind turbine and compared with the predetermined frequency threshold value to determine when the actual wind farm grid frequency is above or below the frequency threshold value is exceeded. Thereby, when the wind farm grid frequency rises or falls to a level above or below the predetermined frequency threshold value, in particular as a result of the primary black start enabled wind turbine (and possible other second black start enabled wind turbines) supplying power to the wind farm grid, the at least one secondary black start enabled wind turbine starts operating in black start mode to also supply power to the wind farm grid.

According to a further embodiment of the invention, the electric parameter value is a code modulated onto the grid voltage, and wherein the predetermined condition is met when the code corresponds to a predetermined code.

In other words, the at least one secondary black start enabled wind turbine monitors whether a code corresponding to a predetermined code (in particular a predetermined code unique to the at least one secondary black start enabled wind turbine) is modulated onto the grid voltage. If that is the case, the at least one secondary black start enabled wind turbine starts operating in black start mode to also supply power to the wind farm grid.

According to a further embodiment of the invention, the code is modulated onto the grid voltage when the primary black start enabled wind turbine has been operating in black start mode for a predetermined period of time and/or when the voltage level in the wind farm grid reaches a predetermined voltage level and/or when the wind farm grid frequency is above or below a predetermined frequency value and/or when the primary black start enabled wind turbine has used a pre-determined amount of its capacity, e.g. current, reactive and/or active power.

In other words, the code is modulated into the grid voltage when a predetermined period of time has passed since the primary black start enabled wind turbine started operating in black start mode and/or when the wind farm grid voltage reaches a predetermined voltage level and/or when the wind farm frequency rises above or falls below a predetermined frequency value and/or when the primary black start enabled wind turbine has used a pre-determined amount of its capacity, e.g. current, reactive and/or active power.

The code may be modulated onto the grid voltage by the primary black start enabled wind turbine.

According to a further embodiment of the invention, the at least one secondary black start enabled wind turbine comprises a plurality of secondary black start enabled wind turbines, and the predetermined condition is individual for each of the secondary black start enabled wind turbines.

In other words, the wind farm comprises a plurality of secondary black start enabled wind turbines, and each of these multiple black start enabled wind turbines monitors the electric parameter value in the wind farm grid and determines whether a turbine individual predetermined condition is met or not. Thereby, each of the secondary black start enabled wind turbines starts contributing to the black start by individually supplying power to the wind farm grid when the corresponding individual condition is met.

According to a further embodiment of the invention, the predetermined condition is different for each of the secondary black start enabled wind turbines.

By having different predetermined conditions for each of the secondary black start enabled wind turbines, the secondary black start enabled wind turbines will begin to contribute to the black start one after the other. This may be beneficial as the voltage in the wind farm grid can thereby be ramped up in a staircase-like fashion as the number of active secondary black start enabled wind turbines will be steadily increasing and thereby capable of countering the increasing reactive load of the wind farm grid.

According to a further embodiment of the invention, the predetermined condition is identical for each of the secondary black start enabled wind turbines.

In this case, all secondary black start enabled wind turbines will join the primary black start enabled wind turbine at essentially the same time. This may be beneficial in terms of rapidly ramping up the wind farm grid voltage and simplifying the configuration of the black start wind turbines.

According to a further embodiment of the invention, the predetermined condition is a first predetermined condition for a first group of the secondary black start enabled wind turbines, and wherein the predetermined condition is a second predetermined condition for a second group of the secondary black start enabled wind turbines.

By adding the secondary black start enabled wind turbines in groups, a fast and steady increase in the wind farm grid voltage may be achieved.

According to a further embodiment of the invention, starting the primary black start enabled wind turbine occurs in response to receiving a black start initiation signal at the primary black start enabled wind turbine.

The black start initiation signal may be transmitted by a wind farm controller, either through the normal wind park communication network (if this is operable prior to the black start) or via a separate communication network or connection, such as a dedicated cabled or wireless communication channel. For, in particular, onshore wind farms, the black start may also be initiated by local control of the first black start wind turbine, e.g., by an operator pushing a corresponding button inside or in the vicinity of the primary black start enabled wind turbine. However, the black start initiation signal may alternatively be transmitted from another unit, such as a utility grid controller.

According to a further embodiment of the invention, the method further comprises operating the at least one secondary black start enabled wind turbine in a black start stand-by mode prior to starting the preselected black start enabled wind turbine in black start mode.

In other words, the at least one secondary black start enabled wind turbine is operated in a black start stand-by mode that allows it to enter the black start mode upon detecting that the monitored electric parameter value meets the predetermined condition. In the black start stand-by mode, the blades of the at least one secondary black start enabled wind turbine are spinning, the converter is energized, the breakers are closed, and the control system is powered up and running.

By operating the at least one secondary black start enabled wind turbine in the black start stand-by mode it is assured that it is capable of switching to the black start mode with a minimal delay upon determining that the monitored electric parameter value meets the predetermined condition.

According to a further embodiment of the invention, operating the at least one secondary black start enabled wind turbine in the black start stand-by mode is initiated when receiving the black start initiation signal at the at least one secondary black start enabled wind turbine.

In other words, just like the primary black start enabled wind turbine, the at least one secondary black start enabled wind turbine receives the black start initiation signal discussed above and uses this as a trigger to enter the black start stand-by mode. The primary black start enabled wind turbine may also be started in the black start stand-by mode prior to entering the black start mode of operation. As discussed above in conjunction with the primary black start enabled wind turbine, the black start initiation signal may also correspond to local control of the at least one secondary black start wind turbine, e.g., by an operator pushing a corresponding button inside or in the vicinity of the at least one secondary black start enabled wind turbine.

According to a further aspect of embodiments of the invention there are provided a wind farm comprising (a) a primary black start enabled wind turbine, (b) at least one secondary black start enabled wind turbine, and (c) a wind farm grid interconnecting at least a part of the wind turbines in the wind farm. The primary black start enabled wind turbine is configured to start operating in a black start mode in order to supply voltage to the wind farm grid. The at least one secondary black start enabled wind turbine is configured to monitor an electric parameter value in the wind farm grid and to start operating in black start mode in order to supply voltage to the wind farm grid when the monitored electric parameter value meets a predetermined condition.

This aspect of embodiments of the invention are essentially based on the same idea as the first aspect discussed above. That is, the at least one secondary black start enabled wind turbine is configured to join the primary black start enabled wind turbine in supplying voltage to the wind farm grid once the monitored electric parameter value meets the predetermined condition. Hence, no centralized control of the secondary black start enabled wind turbine is necessary. By choosing the predetermined condition carefully, it can be assured that the secondary black start enabled wind turbine joins the primary black start enabled wind turbine in such a way that the overall black start process is optimized, in particular such that a smooth and rapid energization of the wind farm grid with minimum risk of causing damage to the electrical components of the wind turbines and wind farm grid can be achieved.

According to a further embodiment of the invention, the wind farm further comprises at least one ordinary wind turbine that is not black start enabled.

Modern wind farms comprise tens or even hundreds of individual wind turbines. In many cases, the ordinary wind turbines may be between 85% and 95% of the total number of wind turbines in a wind farm while the black start enabled wind turbines may be between 5% and 15% of the total number of wind turbines. In other words, a wind farm with 100 wind turbines may comprise around 90 ordinary wind turbines and around 10 black start enabled wind turbines.

According to a further embodiment of the invention, the wind turbine further comprises a controller configured to transmit a black start initiation signal to the primary black start enabled wind turbine and/or to the at least one secondary black start enabled wind turbine.

The black start initiation signal may cause the primary black start enabled wind turbine and/or to the at least one secondary black start enabled wind turbine to enter a black start stand-by mode in which the blades of the respective wind turbines are spinning, the converter is energized, the breakers are closed, and the control system is powered up and running. Furthermore, the primary black start enabled wind turbine may enter the black start mode, possibly with a short delay allowing the at least one secondary black start enabled wind turbine to enter the black start stand-by mode, in response to receiving the black start initiation signal.

The black start initiation signal may be transmitted either through the normal wind park communication network (if this is operable prior to the black start) or via a separate communication network or connection, such as a dedicated cabled or wireless communication channel. For, in particular, onshore wind farms, the black start initiation signal may also be given via local control at the black start enabled wind turbine, e.g., by an operator pushing a corresponding button inside or in the vicinity of the black start enabled wind turbine.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention are not limited to the described exemplary embodiments.

BRIEF DESCRIPTION

Some of the embodiments will be described in detail, with reference to the following figures, wherein like designations denote like members, wherein:

FIG. 3 shows a timing chart of control signals for operating black start enabled wind turbines in a wind farm during a black start in accordance with an embodiment.

DETAILED DESCRIPTION

Figure 1:
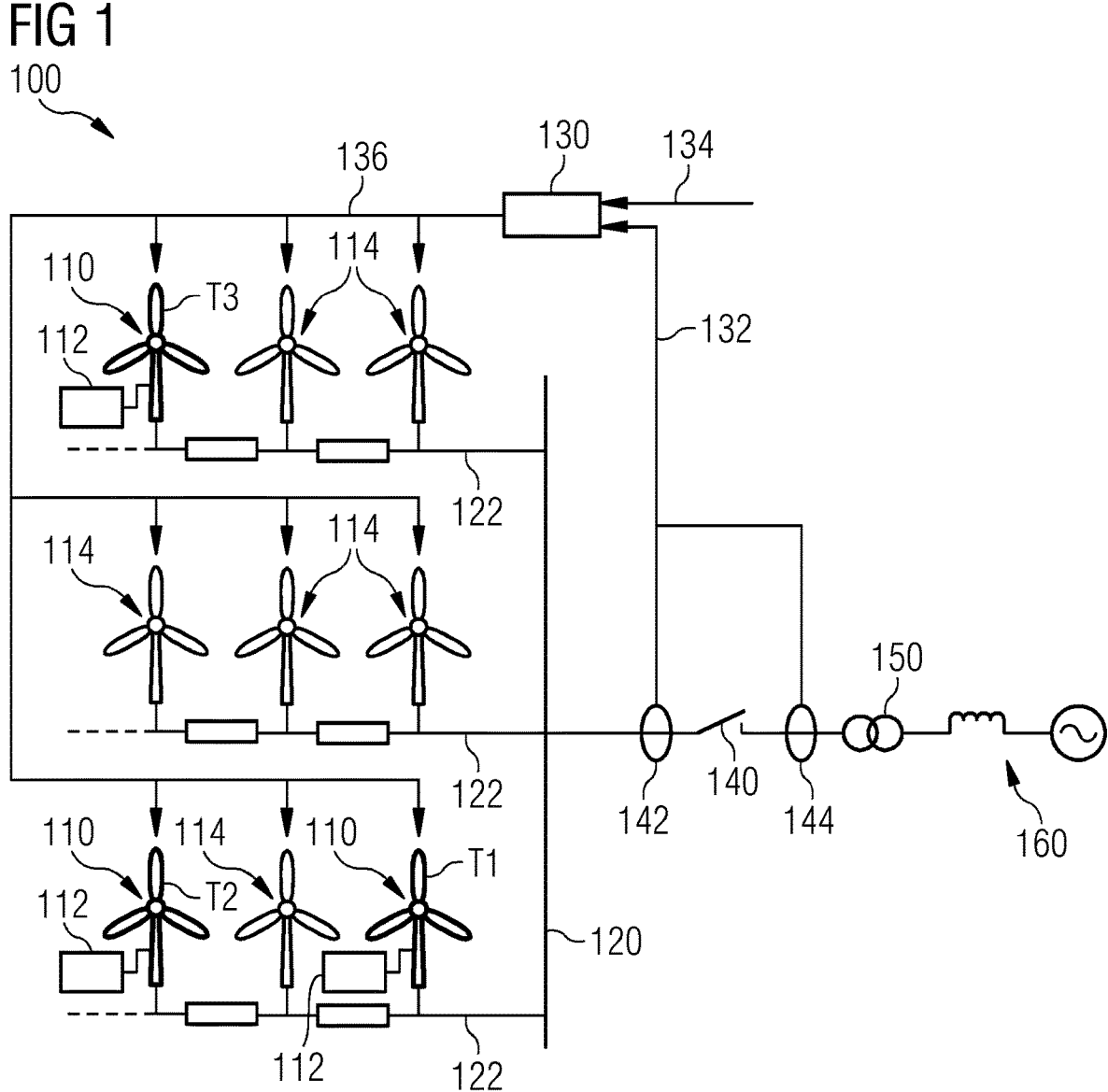
FIG. 1 shows a wind farm comprising a mix of ordinary and black start enabled wind turbines.

The illustration in the drawing is schematic. It is noted that in different figures, similar or identical elements are provided with the same reference numerals or with reference numerals which differ only within the first digit.

FIG. 1 shows a wind farm 100 comprising a mix of ordinary wind turbines 114 and black start enabled wind turbines 110. The wind turbines 110, 114 are arranged in rows and interconnected by cables 122 connected to a common feeder 120 which is connected to utility grid 160 via main breaker switch 140 and transformer 150. The common feeder 120 and cables 122 form a wind farm grid.

Each black start enabled wind turbine 110 is connected to its own dedicated power generator/storage unit 112 which is configured to supply auxiliary power to the black start enabled wind turbine 110 when the wind farm grid 120, 122 is deenergized. The wind farm 100 further comprises a wind farm controller 130 configured to receive internal input 132 from one sensor device 142 on the wind farm side of the main breaker switch 140 and from another sensor device 144 on the grid side of the main breaker switch 140. Measurements on both sides of the wind farm breaker is an optional feature but enables the wind farm controller 130 to resynchronize and connect the wind farm to the utility grid 160 when this part of the network has been energized. The internal input 132 to controller 130 may include measurement values of voltage frequency and magnitude on both the wind farm side and the utility grid side of main breaker switch 140. Furthermore, the internal input 132 may include a status of the main breaker switch 140. The controller 130 is further configured to receive external input 134, e.g., from a utility grid operator (not shown). The controller 130 is connected to a wind farm communication network 136 which (at least during normal operation) allows the controller 130 to communicate with each individual wind turbine 110, 114 in the wind farm 100.

The black start enabled wind turbines 110 are capable of operating in a black start mode to produce and provide electrical power in order to energize the wind farm grid 120, 122 in case of a power outage where no power is available from the utility grid 160.

Figure 2:
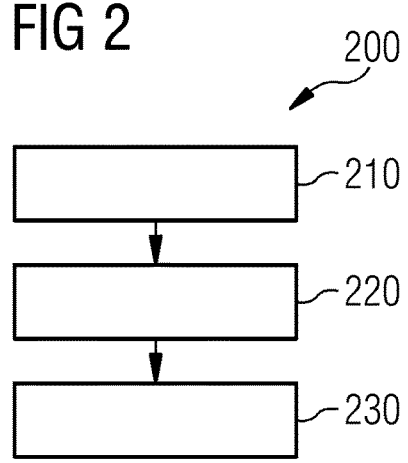
FIG. 2 shows a flowchart of a method of performing a black start in a wind farm in accordance with an embodiment.

FIG. 2 shows a flowchart of a method 200 of performing a black start in a wind farm 100 (see FIG. 1) in accordance with an embodiment. Here, one of the black start enabled wind turbines 110 is preselected as a primary black start enabled wind turbine T1 and the remaining black start enabled wind turbines 110 are preselected as secondary black start enabled wind turbines T2, T3.

In embodiments, the method 200 begins at 210 by starting the primary black start enabled wind turbine T1 in black start mode in order to supply voltage to the wind farm grid and thereby cause the voltage in the wind farm grid to increase. This may occur in response to receiving a black start initiation signal at the primary black start enabled wind turbine T1, either through an operational part of the communication network 136 or through a dedicated communication channel (not shown).

At 220, the at least one secondary black start enabled wind turbine (FIG. 1 shows two secondary black start enabled wind turbines T2, T3) monitors an electric parameter value in the wind farm grid, such as a voltage magnitude, a frequency, or a code modulated onto the voltage. At this time, each of the secondary black start enabled wind turbines T2, T3 may be operated in a black start stand-by mode, where the rotors are spinning and the converters are energized, etc.

The secondary black start enabled wind turbines T2, T3 may start operating in the black start stand-by mode in response to receiving the above-mentioned black start initiation signal.

At 230, the at least one secondary black start enabled wind turbine T2, T3 is started in black start mode in order to supply voltage to the wind farm grid when the monitored electric parameter value meets a predetermined condition which may be individual for each secondary black start enabled wind turbine T2, T3. The predetermined condition may for example be met when the voltage level in the wind farm grid 120, 122 is above a predetermined voltage threshold value, or when the voltage frequency in the wind farm grid is above or below a predetermined frequency threshold value, or when a code modulated onto the grid voltage is determined to correspond to a predetermined code. The predetermined condition may be different or identical for each of the secondary black start enabled wind turbines T2, T3. Alternatively, the predetermined condition may be a first predetermined condition for a first group of secondary black start enabled wind turbines 110 while the predetermined condition is a second predetermined condition for a second group of secondary black start enabled wind turbines 110.

In short, the above procedure results in that the primary black start enabled wind turbine T1 starts supplying power to the wind farm grid 120, 122, and that the secondary black start enabled wind turbines T2, T3 joins it once their respective conditions are fulfilled, i.e., sequential one after the other, all together at essentially the same time, or in groups. The trigger for the secondary black start enabled wind turbines T2, T3 to start operating in black start mode is individual conditions relating to an electric parameter value in the wind farm grid. Hence, no active interaction from the farm controller 130 or from any other control unit is needed in order to make the secondary black start enabled wind turbines T2, T3 join the primary black start enabled wind turbine T1 to perform a black start of the wind farm 100. Once the primary black start enabled wind turbine T1 has been started in black start mode, the other (secondary) black start enabled wind turbines T2, T3 will join it as soon as their monitoring reveals that the corresponding conditions are met.

FIG. 3 shows a timing chart of control signals for operating black start enabled wind turbines in a wind farm during a black start in accordance with an embodiment. More specifically, FIG. 3 shows a plot 310 showing the wind farm grid voltage V as a function of time, a control signal 321 for a primary black start enabled wind turbine T1, a control signal 322 for a first secondary black start enabled wind turbine T2, and a control signal 323 for a third secondary black start enabled wind turbine T3. In this embodiment, the wind farm grid voltage V is monitored and used to determine when to start operating the secondary black start enabled wind turbines T2, T3 in black start mode. The primary black start enabled wind turbine T1 begins operating in black start mode at time $t=t_1$ when the corresponding control signal 321 shifts to ON. This causes the wind farm grid voltage V to increase along a first ramp segment 311. When the wind farm grid voltage V reaches a first threshold value $V_{thres1}$ at time $t=t_2$, the first secondary black start enabled wind turbine T2 determines that its predetermined condition is met and consequently switches to black start mode by toggling its corresponding control signal 322 to ON. The wind farm voltage continues to increase along a second ramp segment 312. When the wind farm grid voltage V reaches a second threshold value $V_{thres2}$ at time $t=t_3$, the second secondary black start enabled wind turbine T3 determines that its predetermined condition is met and consequently switches to black start mode by toggling its corresponding control signal 323 to ON. The wind farm voltage V then continues to increase along a third ramp segment 313. At time $t=t_4$, the wind farm grid voltage V reaches a level $V_{min}$ which is the lowest voltage at which the complete wind farm may be safely operated without the risk of causing damage to the wind ordinary wind turbines. At time $t=t_5$, the wind farm grid voltage V reaches a target level $V_{target}$ which is the desired voltage level in the wind farm grid during normal operation. This level is maintained along segment 314 and the wind farm 100 can now be (re)connected to the utility grid 160 and, if necessary, contribute to restoring the utility grid voltage. Alternatively, the wind farm is operated in island mode as means to supply the islanded electrical load, which could be wind turbine and substation auxiliary load, and which could also include dedicated customers as e.g., an electrolyzes plant.

The energization, that is the complete voltage ramp from 0% to $V_{min}$, must be completed fast enough to avoid damaging the electrical components, i.e., it is required that $t_4-t_1 \le T_{Limit}$. It is desirable to keep the time outside this window short, e.g., below 30 to 60 seconds, to avoid the risk of extended operation at voltage levels that the electrical components have not been verified for, or potentially much shorter, e.g., below 5 seconds, if electrical protection equipment cannot safely detect electrical faults during the voltage ramping. This is possible with embodiments of the present invention where the secondary black start enabled wind turbines T2, T3 join the primary black start enabled wind turbine automatically in dependency of one or more conditions relating to a monitored electrical parameter value in the wind turbine grid 120, 122.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of performing a black start in a wind farm, the wind farm comprising a primary black start enabled wind turbine, at least one secondary black start enabled wind turbine, and a wind farm grid interconnecting at least a part of the wind turbines in the wind farm, the method comprising;
    starting the primary black start enabled wind turbine in black start mode in order to supply voltage to the wind farm grid;
    monitoring, at the at least one secondary black start enabled wind turbine, an electric parameter value in the wind farm grid; and
    starting the at least one secondary black start enabled wind turbine in black start mode in order to supply voltage to the wind farm grid when the electric parameter value meets a predetermined condition; and
    wherein the electric parameter value is a code modulated onto the grid voltage, and wherein the predetermined condition is met when the code corresponds to a predetermined code.

2. The method according to claim 1, wherein the code is modulated onto the grid voltage when the primary black start enabled wind turbine has been operating in black start mode for a predetermined period of time and/or when the voltage level in the wind farm grid reaches a predetermined voltage level and/or when the wind farm grid frequency is above or below a predetermined frequency value and/or when the primary black start enabled wind turbine has used a pre-determined amount of capacity.

3. The method according to claim 1, wherein the at least one secondary black start enabled wind turbine comprises a plurality of secondary black start enabled wind turbines, and the predetermined condition is individual for each of the secondary black start enabled wind turbines.

4. The method according to claim 3, wherein the predetermined condition is different for each of the secondary black start enabled wind turbines.

5. The method according to claim 3, wherein the predetermined condition is identical for each of the secondary black start enabled wind turbines.

6. The method according to claim 3, wherein the predetermined condition is a first predetermined condition for a first group of the secondary black start enabled wind turbines, and the predetermined condition is a second predetermined condition for a second group of the secondary black start enabled wind turbines.

7. The method according to claim 1, wherein starting the primary black start enabled wind turbine occurs in response to receiving a black start initiation signal at the primary black start enabled wind turbine.

8. The method according to claim 1, further comprising operating the at least one secondary black start enabled wind turbine in a black start stand-by mode prior to starting the preselected black start enabled wind turbine in black start mode.

9. The method according to claim 8, wherein operating the at least one secondary black start enabled wind turbine in the black start stand-by mode is initiated when receiving the black start initiation signal at the at least one secondary black start enabled wind turbine.

10. A wind farm comprising;
    a primary black start enabled wind turbine;
    at least one secondary black start enabled wind turbine; and
    a wind farm grid interconnecting at least a part of the wind turbines in the wind farm;
    wherein the primary black start enabled wind turbine is configured to start operating in a black start mode in order to supply voltage to the wind farm grid; and
    wherein the at least one secondary black start enabled wind turbine is configured to monitor an electric parameter value in the wind farm grid and to start operating in black start mode in order to supply voltage to the wind farm grid when the electric parameter value meets a predetermined condition; and
    wherein the electric parameter value is a code modulated onto the grid voltage, and wherein the predetermined condition is met when the code corresponds to a predetermined code.

11. The wind farm according to claim 10, further comprising at least one ordinary wind turbine that is not black start enabled.

12. The wind farm according to claim 10, further comprising a controller configured to transmit a black start initiation signal to the primary black start enabled wind turbine and/or to the at least one secondary black start enabled wind turbine.

* * * * *